United States Patent [19]

Godfrey

[11] Patent Number: 5,109,227
[45] Date of Patent: Apr. 28, 1992

[54] APPARATUS FOR IDENTIFYING AND TRACKING A TARGETED NUCLEAR SOURCE

[76] Inventor: Wesley L. Godfrey, P.O. Box 131, Barnwell, S.C. 29812

[21] Appl. No.: 575,843

[22] Filed: Aug. 31, 1990

[51] Int. Cl.$^5$ .............................................. G08B 21/00
[52] U.S. Cl. ................................. 340/600; 250/359.1; 364/511
[58] Field of Search ..................... 340/600; 250/331.6, 250/358.1, 359.1; 364/516, 555, 527

[56] References Cited

U.S. PATENT DOCUMENTS

| | | | |
|---|---|---|---|
| 3,004,258 | 10/1961 | Cohen et al. | 343/112 |
| 3,099,834 | 7/1963 | Sarbacher | 343/101 |
| 3,291,987 | 12/1966 | Chope | 250/363.01 |
| 3,403,254 | 9/1968 | Campanella | 250/395 |
| 3,508,055 | 4/1970 | Wright et al. | 250/394 |
| 4,172,226 | 10/1979 | Rubin | 250/312 |
| 4,480,311 | 10/1984 | Mastain et al. | 364/527 |
| 4,509,042 | 4/1985 | Kruse | 340/600 |
| 4,523,186 | 6/1985 | Fiarman | 340/555 |
| 4,598,202 | 7/1986 | Koechner | 250/366 |
| 4,742,340 | 5/1988 | Novik et al. | 340/572 |
| 4,814,751 | 3/1989 | Hawkins et al. | 340/573 |
| 4,827,395 | 5/1989 | Anders et al. | 364/138 |
| 4,853,692 | 8/1989 | Wolk et al. | 340/573 |
| 4,862,143 | 8/1989 | Hirshfield et al. | 340/600 |
| 4,931,646 | 6/1990 | Koechner | 340/600 |

Primary Examiner—Glen R. Swann, III
Attorney, Agent, or Firm—Benoni O. Reynolds

[57] ABSTRACT

A plurality of fixed gamma ray detectors is deployed along a corridor or other path to be taken by a targeted nuclear source. Each fixed gamma ray detector and its associated electronics splits the spectrum of any gamma rays detected into two energy groups, one on either side of a predetermined and variable discrimination line along the energy base line. A plurality of paired single channel analyzers (dual channel analyzer), each pair collocated and electronically connected with a gamma ray detector, records the count of each portion of the detected gamma ray spectrum. A host computer computes the ratio between the radiation counts of the two energy groups on a recurring basis and compares the ratio taken on one reading of the detectors with the ratio taken on a previous reading of the detectors. An audible or visual alarm, connected to the computer, is produces when the ratio between the two energy groups has changed or has not met an expected value. To avoid simulation of the nuclear source, the coverage of the two energy groups together, in relation to the total spectrum of the detected gamma ray, or to each other, can be varied and the ratios between the upper and lower portions can be manipulated by changing the position of the discrimination line between the two energy groups. A series of the ratios obtained could be used collectively to identify the gamma emitting sample.

14 Claims, 3 Drawing Sheets

DETECTION AND ANALYSIS SYSTEM

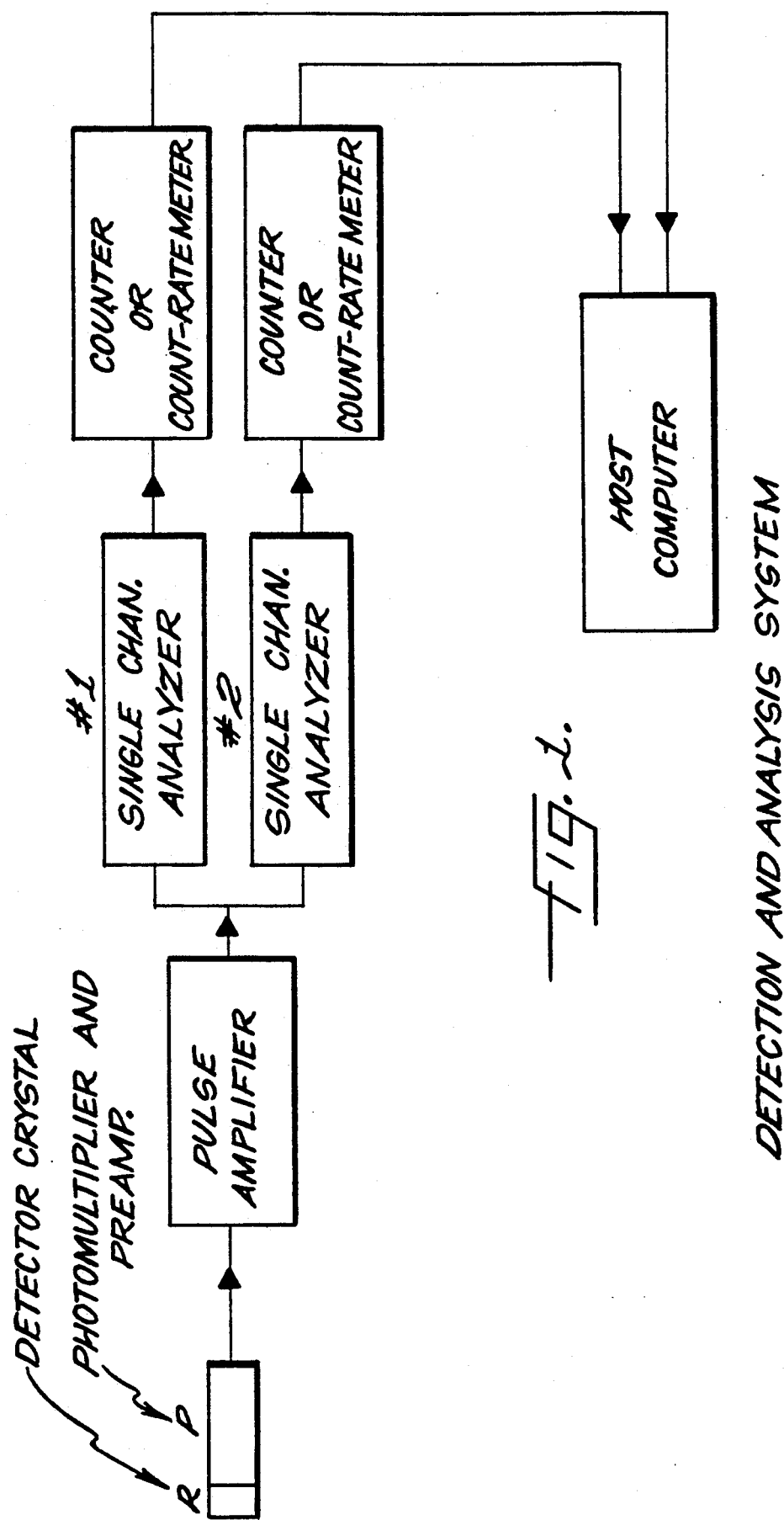

APPARATUS FOR IDENTIFYING AND TRACKING A TARGETED NUCLEAR SOURCE

BACKGROUND OF THE INVENTION

1. Field of the Invention:

This invention relates to a method for identifying and tracking special nuclear material (SNM). More particularly it relates to using the emissions from radioactive material to identify and track such material in manufacturing or storage settings.

2. Description of Prior Art:

The identity and location of certain components of manufactured items containing radioactive material has posed a continuing problem. Such material must be closely monitored throughout its movement for the safety of personnel nearby, for national security and for the prevention of theft. Components of complex nuclear devices contain varying amounts of radioactive material known in the industry as special nuclear material (SNM). Some components contain sufficient radioactive material to be dangerous to approach or handle, thus requiring special remote or shielded handling equipment. In addition, such components can have a high intrinsic value running into the thousands of dollars. Other components may be uniquely complex being in high demand by other nations seeking a capability in nuclear technology. For all these reasons, a manufacturer using these materials is held accountable for each and every component, subassembly or finished product. Of economic necessity, he must seek the highest level of security that can be achieved within the limits of the environment involved.

In the prior art, both direct and indirect methods of tracking and identifying radioactive material are found. But in these cases radioactive emitters are purposely placed on items to be tracked, such as vehicles or aircraft. As early as 1961, Cohen et al. (U.S. Pat. No. 3,004,258) discloses the use of radioactive emitters and detectors to control and guide vehicles. Also, the reference suggests a ground based blind landing system using a similar technique. Sarbacher (U.S. Pat. No. 3,099,834) in 1963 discloses the use of radioactive emitters and detectors in a system for aircraft traffic control with the information fed by communication links to a central control station. Chope (U.S. Pat. No. 3,291,987) in 1966 discloses a missile tracking system based on a radioactive source affixed to a missile. Campanella (3,403,254) in 1968 uses penetration radiation for a guide path approach system.

Wright et al., (U.S. Pat. No. 3,508,055) in 1970 discloses perhaps the first use of penetration radiation in the detection of intruders. He relies on the absorption of some of the radiation by an intruder to identify his presence. Koechner (U.S. Pat. No. 4,598,202), later in 1986, discloses the combination of nuclear radiation and light signals from a pressure sensitive optical fiber for a perimeter detection system.

Apparatus and a method for remotely determining the location of unknown nuclear radiation sources is disclosed in 1979 by Rubin (U.S. Pat. No. 4,172,226). He used omnidirectional detectors arranged in a known geometry to feed signals provided by the detectors to a signal acquisition and computer system. A complicated set of equations is used to analyze the ratios of field intensities from the detectors to determine the location of the nuclear source.

In the safety area, Mastain et al. (U.S. Pat. No. 4,480,311) in 1984 discloses a dosimeter with a binary counter for monitoring the extent of radiation to which personnel have been exposed. A portable radiation monitor of the walk-through variety is disclosed by Kruse (U.S. Pat. No. 4,509,042) in 1985. He uses a combination of a counter, software and a microprocessor to sound an alarm when radiation with certain pulse shape is detected. A tamper-indicating seal system is disclosed by Fiarman (U.S. Pat. No. 4,523,186) in a 1985 reference. A break in an optical signal is used to detect unauthorized attempts to obtain access to valuable material such as nuclear material.

Gamma emitters and detectors have also been used in the detection of counterfeit articles such as credit cards. Novik et al. in 1988 discloses a method and apparatus for such detection where the article contains an isotope and the ratio of the gamma rays before and after the article is inserted in the apparatus is used to authenticate the article. Although not directly relevant, conventional radio transmitters and receivers have been used to track patients in nursing homes or similar institutions. Active transceiver and one or more passive transceivers are found in systems (Limis) for controlling manufacturing systems having work stations. Their non-communication detectors include detectors for ions, elemental particles, concentrations, etc. Applications disclosed by Anders et al. (U.S. Pat. No. 4,827,395), in 1989, provide security for valuable items in a home or museum which can be individually coded for identification. Infant security systems using transmitting devices generating coded signals and magnetic strips are disclosed by Wolk et al. (U.S. Pat. No. 4,853,692).

As can be seen, prior art methods and apparatus have contributed much to the breadth of security applications but very few have been addressed to the special problems associated with the monitoring of special nuclear material. Tradeoffs are required between sensitivity of detection and safety. Also, most earlier systems are subject to compromise and deception. The present invention overcomes these drawbacks by utilizing fixed gamma ray detection systems which split the spectrum of the detected gamma ray, the ratios of the upper and lower portions of the spectrum being used to locate and identify positively the nuclear source and any tempering therewith.

Prior art known to this inventor includes the following U.S. Pat. Nos.:

| | | |
|---|---|---|
| 3,004,258 | 10/1961 | Cohen et al. |
| 3,009,834 | 7/1963 | Sarbacher |
| 3,291,987 | 12/1966 | Chope |
| 3,403,254 | 9/1968 | Campanella |
| 3,508,055 | 4/1970 | Wright et al. |
| 4,172,226 | 10/1979 | Rubin |
| 4,480,311 | 10/1984 | Mastain et al. |
| 4,509,042 | 4/1985 | Kruse |
| 4,523,186 | 6/1985 | Fiarman |
| 4,598,202 | 7/1986 | Koechner |
| 4,742,340 | 5,1988 | Novik et al. |
| 4,814,751 | 3/1989 | Hawkins et al. |
| 4,827,395 | 5/1989 | Anders et al. |
| 4,853,692 | 8/1989 | Wolk et al. |

BRIEF SUMMARY OF THE INVENTION

The present invention is apparatus for identifying and tracking a targeted nuclear source usually in a manufacturing or storage facility. It is a highly sophisticated approach to the problem of unauthorized movement of SNM (special nuclear material). The location of such material must be monitored for personnel safety and the intrinsic value of some materials is such that they are subject to theft.

According to the preferred embodiment of this invention, the apparatus has:

a detector means to detect any gamma rays emitted by readings of any nuclear source and to convert the gamma ray detected into electrical signals;

an analyzing means which measures the radiation count of any gamma rays detected, electronically connected to the detector means, to split the spectrum of any gamma rays detected on either side of a predetermined and variable discrimination line into two energy groups, an upper portion and a lower portion, and to compute and compare the ratio of the radiation count of the upper portion and the radiation count of the lower portion of the gamma ray spectrum taken on one reading of the detector means with the ratio of radiation counts between the upper portion and the lower portion taken on a previous reading of the detector means or with an expected value;

an alarm means, electronically connected to the analyzing means, for indicating, in a particular reading by the detector means, when the ratio of radiation counts between the two energy groups has changed or has not met an expected value.

Detector means is a plurality of fixed gamma ray detectors (crystal or proportional), each fixed gamma ray detector feeding into a photomultiplier, preamplifier and pulse amplifier, located along a corridor or other path to be taken by the targeted nuclear source.

Analyzing means is a plurality of paired single channel analyzers (also called a dual channel analyzer), deployed in close association with the detector means, each single channel analyzer having a count rate meter or counter to determine the radiation count of the upper and lower portions of the gamma ray spectrum, a host computer to determine the ratio of the radiation counts between the upper portion and the lower portion of the gamma ray spectrum and automatically compare the ratio:

to another ratio taken previously, or to a library of ratios for various targeted nuclear sources, actuating an alarm means when an unexpected ratio value is detected.

Alarm means produces, alternatively or collectively, an audible sound, a visual signal, a radio frequency signal or an infrared signal.

To avoid simulation of the nuclear source, the coverage of the two energy groups together, in relation to the spectrum of the detected gamma ray, can be manipulated by changing the position of the discrimination line between the two energy groups known as the upper portion and the lower portion (ranges of energy level). Thus, the two energy groups together could exactly cover the spectrum of the detected gamma rays without overlapping each other; the two energy groups might not entirely cover the spectrum of the detected gamma rays or the two energy groups could overlap in whole or in part.

The ratio of the two energy groups need not be the same for each fixed gamma ray detector. The ratio of the two energy groups could be the same for each fixed gamma ray detector or the ratio might not be the same for each fixed gamma ray detector. Also, the series of ratios between the two energy groups obtained can be used collectively to identify the targeted nuclear source. The alarm means can be actuated if the series of ratios does not match a series of corresponding ratios from a known sample of the targeted nuclear source.

OBJECTIVES OF THE INVENTION

The objectives of the present invention are to provide improved identification and tracking of special nuclear material through apparatus which will:

1) immediately detect the absence or the substitution of the nuclear source;

2) be effective along regular normal transportation routes or potential diversionary routes;

3) require no pause in front of the detector and require no particular orientation of the nuclear source;

4) be sensitive enough to detect and identify the nuclear source under shielded conditions;

5) split the detected gamma ray spectrum into two energy groups and compare the ratio of the two portions in such a way that makes deception of the detector by substituting a dummy nuclear source virtually impossible;

6) provide audio or visual alarm in event of tampering with the nuclear source or the detection of an unexpected ratio value.

Other objectives and advantages of the present invention will be apparent during the course of the following detailed description.

BRIEF DESCRIPTION OF THE DRAWINGS

FIG. 1 is a functional layout showing the interconnection of the elements of the detector means and the analyzer means of the present invention.

DETAILED DESCRIPTION OF THE PREFERRED EMBODIMENT

The present invention is improved apparatus for identifying and tracking a targeted nuclear source. In a manufacturing facility which utilizes radioactive material in their product components, the unauthorized movement or tampering with such components is a continual threat. Such material endangers the health of nearby personnel and also must be secure against theft or tampering for national security and economic reasons.

The apparatus of the present invention has a detector means, an analyzing means and alarm means. The detector means detects any gamma ray emitted by the targeted nuclear source and converts the readings of any gamma ray detected into electrical signals. The analyzing means which measures the radiation count of any gamma rays detected is electronically connected to the detector means. Analyzing means splits the spectrum of any gamma rays detected into two energy groups, an upper portion and a lower portion, along an energy baseline. The analyzing means also computes and compares the ratio of the radiation count of the upper portion and the radiation count of the lower portion taken on one reading of the detector means with the ratio of the radiation counts of the upper portion and lower portion taken on a previous reading of the detector means or with an expected value. The alarm means, electronically connected to the analyzing means, indicates, in a particular reading by the detector means, when the ratio of radiation counts between the two energy groups has changed or has not met an expected value.

Figure 5:
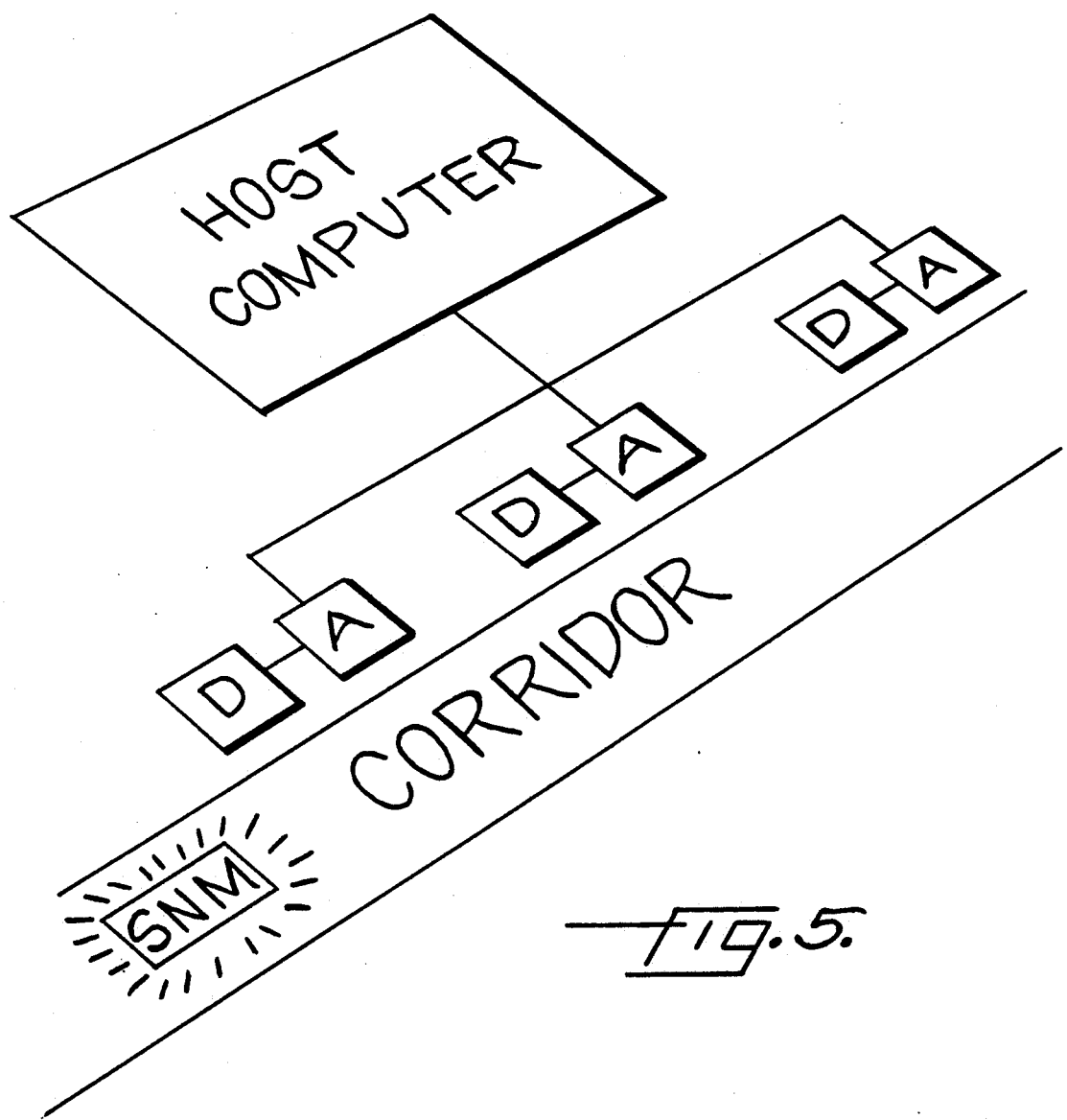
FIG. 5 is a perspective view of the side by side deployment of the fixed gamma ray detectors and the paired single channel analyzers used in carrying out the present invention.

In the present invention, detector means is a plurality of fixed gamma ray detectors (crystal or proportional), each of the fixed gamma ray detectors feeding into a photomultiplier, preamplifier and pulse amplifier, located along a corridor or other path to be taken by a targeted nuclear source, as shown in FIG. 5. Since the location of each detector is fixed, a signal from the detector can be used to identify the location of the targeted nuclear source which initiated the signal. By following the sequence of detector signals and by knowing their location, special nuclear material (SNM) can be tracked along the transfer route.

The purpose of any radiation detector is to convert the ionization produced by radiation into a detectable electrical signal. A fixed crystal gamma ray detector has the property that a gamma ray entering the crystal is converted into a tiny flash of light, whose amplitude is proportional to the energy of the detected gamma ray. The photomultiplier, into which the fixed crystal gamma ray detector feeds, converts the tiny flash of light into a proportional pulse of electrical charge and amplifies it. The preamplifier, into which the photoamplifier feeds, adds further amplification of the charge pulse. The pulse amplifier, into which the preamplifier feeds, does some shaping of the pulse and provides additional amplification of the electrical signal. The net result of the output of the pulse amplifier is a voltage pulse having the duration of a few microseconds (millionth of a second) and whose amplitude is directly proportional to the energy of the detected gamma ray that caused it. The amplification of the system to this point is usually adjusted so that the gamma rays of interest have pulse amplitudes in the range of 0 to 10 volts.

Analyzing means of the present invention is a plurality of paired single channel analyzers, deployed in close association with the detector means, each of the single channel analyzers having a count rate meter or a counter, to determine the radiation count of the upper and lower portions of the detected gamma ray spectrum.

The output of each pulse amplifier is connected to the input terminals of a pair of single channel analyzers. Two single channel analyzers are sometimes packaged in a single module (for convenience) and the module is referred to as a dual channel analyzer. A single channel analyzer has controls that allow a "window" to be set in the range of 0 to 10 volts such that an input pulse that falls in the "window" results in a standard output pulse. The standard output pulse has a uniform amplitude and duration (+5 volts, 0.5 microseconds) irrespective of the gamma ray that caused it. Thus, an output pulse from the single channel analyzer is a signal that a gamma ray, having an energy inside the "window", has been detected.

The output pulses from the single channel analyzers are fed either to counters or count-rate meters to measure radiation count. The counters simply count the number of pulses over a preset time interval, while the count-rate meters produce a varying voltage whose instantaneous value is proportional to the rate at which the pulses are arriving at the input. Either of these types of module could be used, although the use of counters simplifies the interface to the host computer.

Thus, in the case of gamma ray interaction, the rays strike the fixed gamma ray detector and create a measurable output signal which can be fed into paired single channel analyzers for a measurement of the radiation count and into a host computer for a display of the signal or signals generated.

The host computer of the analyzing means will receive input from the single channel analyzers, control the alarm generation logic and maintain the information required to interact with other systems. This host computer determines the ratio of the radiation counts between the upper and lower portions of the gamma ray spectrum and automatically compares the ratio to another ratio taken previously or to a library of ratios for various targeted nuclear sources. This host computer actuates the alarm means when an unexpected ratio value is detected by the detector means. The alarm means produces an audible sound, a visual signal, a radio frequency signal or infrared signal or some combination thereof. The devices to produce such alarms are well known in the art and the alarms are only a method of alerting the using personnel when unauthorized movement or tampering of the target nuclear source is encountered. The desire for surprise or the manufacturing environment may dictate the use of one alarm media over another.

Thus, the spectrum is divided by each gamma ray detector and its associated electronics into two energy groups on either side of a predetermined and variable discrimination line between the two energy groups. This splitting capability gives an infinite range of choices as to where on the energy base line to make the division of the two energy groups. The capability also permits manipulation of the ratios between the two energy groups to prevent simulation or other compromise of the signal created by the gamma ray radiation of any particular targeted nuclear source.

The power supplies necessary to power the electronics in FIG. 1 are well known in the art and thus are not discussed in this detailed description.

Figure 4:
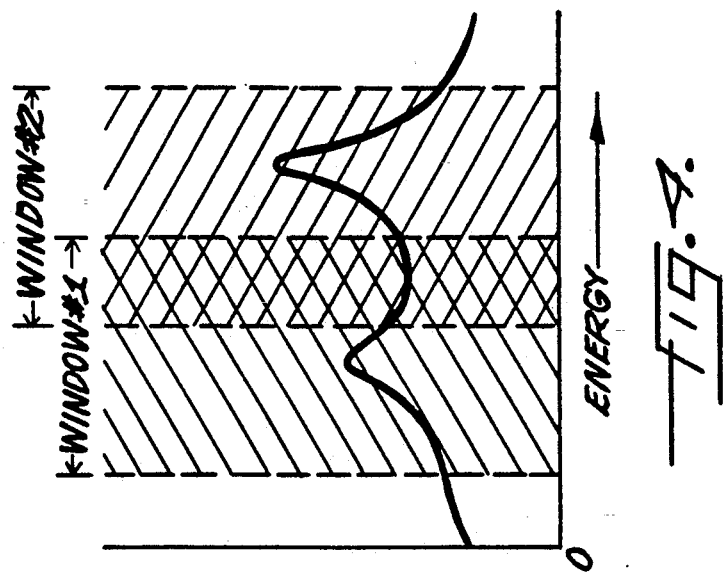
FIG. 4 shows the present invention wherein the two energy groups overlap.
Figure 3:
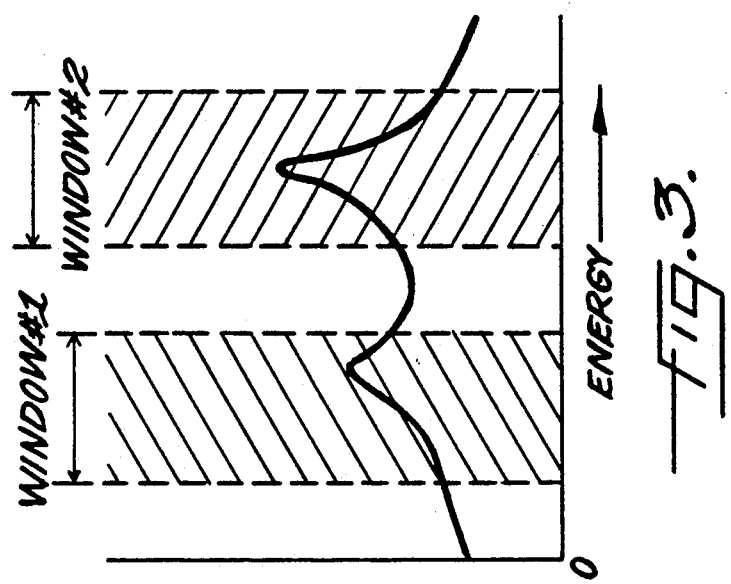
FIG. 3 shows the present invention wherein the two energy groups do not entirely cover the spectrum of the detected gamma rays.
Figure 2:
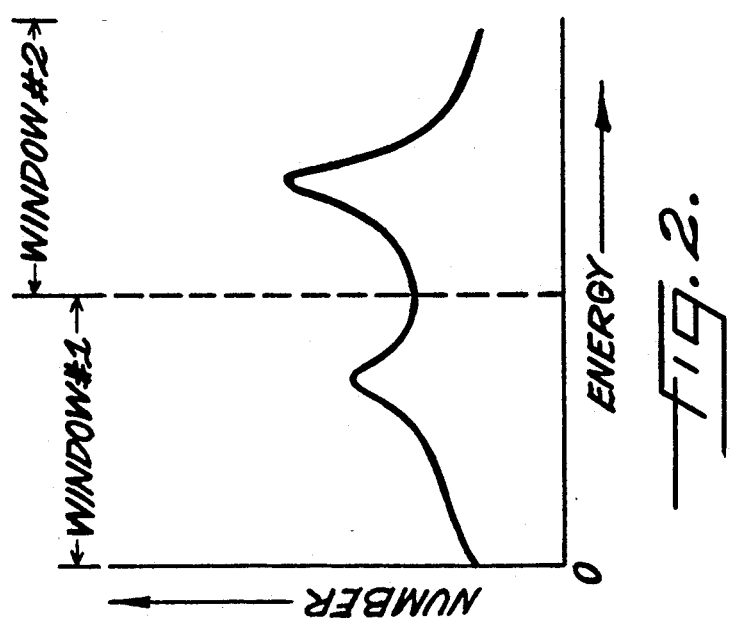
FIG. 2 shows the present invention wherein the two energy groups together exactly cover the spectrum of the detected gamma rays without overlapping.

Using the configuration described above, the present invention also permits a wide choice as to what portion of the spectrum of the gamma ray detected to use in the identification and tracking of the targeted nuclear source. As shown in FIG. 2, the analysis of the detected gamma ray could be done with the two energy groups together entirely covering the spectrum of the detected gamma rays; without overlapping each other. In the alternative, as shown in FIG. 3, the same analysis could be carried out with the two energy groups not entirely covering the spectrum of the detected gamma rays. Lastly, as shown in FIG. 4, the same analysis could be carried out with the two energy groups overlapping in whole or in part.

The present invention also permits the setting of the ratios between the two energy groups to be the same for each fixed gamma detector or not the same for each fixed gamma detector. The setting of the ratios can be changed by varying the position of the discrimination line. which divides the detector signal into two energy groups, along the energy base line.

The present invention also permits the series of ratios between the two energy groups obtained to be used collectively to identify the gamma emitting sample. Thus, the alarm means can be actuated if this series of ratios does not match a series of corresponding ratios from a known sample of a targeted nuclear source.

It can be seen that the flexibility permitted by the use of ratios for identifying and tracking targeted nuclear sources in the present invention enhances the safety, efficiency and security of the manfacturing environment. The versatility of the use of varying portions of the detected gamma ray spectrum also insures against compromise of the method by random observations or external monitoring by hostile personnel.

I claim:

1. Apparatus for identifying and tracking a targeted nuclear source comprising:
   detector means to detect any gamma rays emitted by said nuclear source and to convert readings of any gamma ray detected into electrical signals;
   analyzing means, which measures the radiation count of any gamma rays detected", electronically connected to said detector means,
      to split the spectrum of any gamma rays detected on either side of a predetermined and variable discrimination line into two energy groups, an upper portion and a lower portion, and
      to compute and compare the ratio of the radiation count of said upper portion and the radiation count of said lower portion of said gamma ray spectrum taken on one reading of said detector means with the ratio of radiation counts between said upper portion and said lower portion taken on a previous reading of said detector means or with an expected value;
   alarm means, electronically connected to said analyzing means, for indicating, in a particular reading by said detector means, when the ratio of radiation counts between said two energy groups has changed or has not met an expected value.

2. The apparatus of claim 1, wherein said detector means is a plurality of fixed gamma ray detectors, each said fixed gamma ray detector feeding into a photomultiplier, preamplifier and pulse amplifier, located along a corridor or other path to be taken by said targeted nuclear source.

3. The apparatus of claim 1, wherein said analyzing means is
   a plurality of paired single channel analyzers, deployed in close association with said detector means, each said single channel analyzer having a count rate meter to determine the radiation count of said upper and lower portions of said gamma ray spectrum,
   a host computer to determine the ratio of the radiation counts between said upper portion and said lower portion of said gamma ray spectrum and automatically compare said ratio:
      to another ratio taken previously, or
      to a library of ratios for various targeted nuclear sources,
   actuating said alarm means when an unexpected ratio value is detected.

4. The apparatus of claim 1, wherein said alarm means produces an audible sound.

5. The apparatus of claim 1, wherein said alarm means produces a visual signal.

6. The apparatus of claim 1, wherein said alarm means produces a radio frequency signal.

7. The apparatus of claim 1, wherein said alarm means produces an infrared signal.

8. The apparatus of claim 1, wherein said two energy groups together exactly cover the spectrum of said detected gamma rays without overlapping each other.

9. The apparatus of claim 1, wherein said two energy groups do not entirely cover the spectrum of said detected gamma rays.

10. The apparatus of claim 1, wherein said two energy groups overlap in whole or in part.

11. The apparatus of claim 1, wherein the ratio of said two energy groups is the same for each said fixed gamma ray detector.

12. The apparatus of claim 1, wherein the ratio of said two energy groups is not the same for each said fixed gamma ray detector.

13. The apparatus of claim 1, wherein the series of ratios between said two energy groups obtained is used collectively to identify said targeted nuclear source.

14. The apparatus of claim 1, wherein said alarm means is actuated if the series of ratios between said two energy groups does not match a series of corresponding ratios from a known sample of a targeted nuclear source.

* * * * *